United States Patent
Kloppenburg et al.

(10) Patent No.: US 9,284,385 B2
(45) Date of Patent: Mar. 15, 2016

(54) BIMODAL NEODYMIUM-CATALYZED POLYBUTADIENE

(75) Inventors: Heike Kloppenburg, Düsseldorf (DE); Thomas Gross, Wülfrath (DE)

(73) Assignee: LANXESS Deutschland GmbH, Cologne (DE)

( * ) Notice: Subject to any disclaimer, the term of this patent is extended or adjusted under 35 U.S.C. 154(b) by 69 days.

(21) Appl. No.: 13/577,322

(22) PCT Filed: Feb. 17, 2011

(86) PCT No.: PCT/EP2011/052330
§ 371 (c)(1),
(2), (4) Date: Mar. 19, 2013

(87) PCT Pub. No.: WO2011/101399
PCT Pub. Date: Aug. 25, 2011

(65) Prior Publication Data
US 2013/0172489 A1    Jul. 4, 2013

(30) Foreign Application Priority Data
Feb. 19, 2010    (EP) .................................... 10154132

(51) Int. Cl.
| | |
|---|---|
| C08F 36/06 | (2006.01) |
| C08F 4/52 | (2006.01) |
| A63B 37/00 | (2006.01) |
| B60C 1/00 | (2006.01) |
| C08F 136/06 | (2006.01) |

(52) U.S. Cl.
CPC .............. *C08F 4/52* (2013.01); *A63B 37/0003* (2013.01); *B60C 1/00* (2013.01); *C08F 36/06* (2013.01); *C08F 136/06* (2013.01); *A63B 2209/00* (2013.01)

(58) Field of Classification Search
CPC .......... C08F 136/06; C08F 36/06; C08F 4/52; A63B 37/0003; A63B 2209/00; B60C 1/00
USPC .................... 526/73, 90, 135, 164, 226, 340.4
See application file for complete search history.

(56) References Cited

U.S. PATENT DOCUMENTS

| | | | |
|---|---|---|---|
| 4,076,550 A | 2/1978 | Thurn et al. | |
| 4,260,707 A | 4/1981 | Sylvester et al. | |
| 4,683,257 A * | 7/1987 | Kakiuchi et al. | 524/432 |
| 5,017,539 A | 5/1991 | Jenkins et al. | |
| 5,496,883 A | 3/1996 | Hamada | |
| 5,567,784 A | 10/1996 | Wieder et al. | |
| 5,663,226 A | 9/1997 | Scholl et al. | |
| 6,268,421 B1 | 7/2001 | Dittrich et al. | |
| 6,576,731 B2 * | 6/2003 | Steinhauser et al. | 526/338 |
| 6,706,814 B2 | 3/2004 | Demirors | |
| 2005/0130835 A1 | 6/2005 | Laubry et al. | |
| 2011/0230624 A1 | 9/2011 | Kloppenburg et al. | |

FOREIGN PATENT DOCUMENTS

CA    1143711    3/1983

OTHER PUBLICATIONS

European Search Report from co-pending Application EP10154132.4 dated Jun. 14, 2010, 6 pages.
Oehme et al, The influence of ageing and polymerization conditions on the polymerization of butadiene using a neodymium catalyst system, Die Angewandte Makromolekulare Chemie 235 (1996) 121-130 (Nr. 4098), 1996 Huthig & Wepf Verlag, Zug, Switzerland.
Quirk et al., Butadiene polymerization using neodymium versatate-based catalysts: catalyst optimization and effects of water and excess versatic acid, Polymer 41 (2000) 5903-5908, Elsevier Science Ltd. 2000.
Oehme et al. Polymerixationszeit and Gesamtkatalysatorkonzentration veradern cis-1, 4-Polybutadien, Raw Materials and Applications, KGK Kautschuk Gummi Kunstoffe 50, Janhgang, Nr. 2/97, Germany.
Kloppenburg et al., From golf balls to rolling resistance, pp. 82-86, Tire Technology International 2009, available at www.tiretechologyinternational.com.
Podzimek, S., The Use of GPC Coupled with a Multiangle Laser Light Scattering Photometer for the Characterization of Polymers, on the Determination of Molecular Weight, Size, and Branching, Journal of Applied Polymer Science, vol. 54, 91-103 (1994), John Wiley & Sons, Inc., New York, New York.
Vulcanization, vol. 17, Transitions and Relaxations to Zwitterionic Polymerization, Encyclopedia of Polymer Science and Engineering, John Wiley & Sons, New York, New York.
Compounding, vol. 4, Composites, Fabrication to Die Design, Encyclopedia of Polymer Science and Engineering, 1986, John Wiley & Sons, New York, New York.
Friebe et al, Polymerization of 1,3-Butadiene Initiated by Neodymium Versatate/Triisobutylaluminum/Ethylaluminum Sesquichloride: Impact of the Alkylaluminum Cocatalyst Component, Journal of Macromolecular Science, Part A: Pure and Applied Chemistry, vol. A41, No. 3, pp. 245-256, 2004, Marcel Dekker, Inc., New York, New York.
Maiwald et al, Highly Active Single-Site Catalysts for the 1,4-cis Polymerization of Butadiene from Allylneodymium (III) Chlorides and Trialkylaluminiums—A Contribution to the Activation of Tris(allyl)neodymium(III) and the Further Elucidation of the Structure-Activity Relationship, Macromol. Chem. Phys. 2002, 203, No. 7, pp. 1029-1039, Wiley-VCH VErlag GmbH, Weinheim, Germany 2002.

* cited by examiner

*Primary Examiner* — Irina S Zemel
*Assistant Examiner* — Jeffrey Lenihan (57) ABSTRACT

The invention relates to a high molecular weight bimodal neodymium-catalysed polybutadiene having a high proportion, >95%, of cis-1,4 units and a low proportion, <1%, of 1,2-vinyl content, wherein the polybutadiene has a linear polymeric main fraction and a long chain branched polymeric fraction, wherein the slope in the RGM relationship is >0.5 for the polymeric main fraction and <0.3 for the long chain branched polymeric fraction.

20 Claims, 5 Drawing Sheets

BIMODAL NEODYMIUM-CATALYZED POLYBUTADIENE

The present invention relates to high molecular weight bimodal neodymium-catalysed polybutadiene having a high proportion, >95%, of cis-1,4 units and a low proportion, <1%, of vinyl units, its method of making and use.

Polybutadienes are used in the tyre industry as important constituents of rubber mixtures and for this an improvement in the final properties, such as reduced rolling resistance and reduced abrasion for example, is desired. A further field of use is in golf ball cores or shoe soles, in which case high rebound resilience is a prime concern.

Polybutadienes having a high proportion of cis-1,4 units have been manufactured on a large industrial scale for a considerable period of time, and are used in the manufacture of tyres and of other rubber products and also for impact modification of polystyrene.

Catalysts based on compounds of the rare earths are currently almost being used exclusively to produce high proportions of cis-1,4 units, and they are described in EP-A1 0 011 184 and EP-B-A1 0 007 027 for example.

It is known from the prior art that specifically neodymium-catalysed polybutadienes among the group of high-cis polybutadienes have particularly advantageous properties in respect of rolling resistance, abrasion and rebound resilience.

A person skilled in the art is aware that polybutadienes are produced using structurally defined single-site catalysts based on allyl complexes of rare earths, as described in Macromolecular Chemistry and Physics, 2002 (203/7) 1029-1039 for example.

The catalyst systems used play an important part in the production of polybutadienes.

The industrially used neodymium catalyst, for example, is a Ziegler-Natta system which is formed by a plurality of catalyst components. Catalyst formation involves forming mostly different catalyst sites which can be discerned in the polymer by an at least bimodal molar mass distribution. In the Ziegler-Natta catalyst system, the familiar 3 catalyst components, mostly consisting of a neodymium source, a chloride source and an organoaluminium compound, are mixed in various ways under certain temperature conditions, and the catalyst system is readied for the polymerization with or without ageing.

The prior art reveals a plurality of methods of making Ziegler-Natta catalyst systems used for producing polybutadienes.

EP 0 375 421 B1 describes a process for preparing a catalyst for the polymerization of butadiene, comprising mixing aluminium hydrocarbyl or aluminium hydrocarbyl hydride, neodymium neodecanoate or neodymium naphthenate and a halogen source in a hydrocarbon solution (hexane) at a temperature of −15° C. to −60° C., and ageing the catalyst system for a period of at least 8 hours before use in polymerization. Ageing is preferably carried out at −20° C.

The number of chain ends in the polymer is responsible for energy dissipation. The greater the number of free chain ends, the greater the energy dissipation by the polymer. However, as the energy dissipation of the polymer decreases, rolling resistance decreases and the rebound resilience of the polymer improves, for example. Accordingly, the final properties of a linear polymer having only two chain ends per molecule are always better than those of a branched polymer of the same molar mass.

CoBR and NiBR are also known from the prior art; they are on average more branched than the linear NdBR polymers, as described for example in Tire Technology International (2009), 82-86 and Journal of Macromolecular Science, Pure and Applied Chemistry (2004), A41(3), 245-256.

The advantages of linear NdBR reside particularly in the improved dynamic properties and a lower energy absorption, which lead inter alia to a lower rolling resistance in tyre applications and to improved rebound resilience in golf ball applications. U.S. Pat. No. 6,706,814 B2 states that the use of linear polybutadienes in high impact polystyrene (HIPS) mouldings improves impact toughness, for example.

On the other hand, however, it is known that linear rubbers have high solution viscosities and that these high solution viscosities inevitably also lead to high process viscosities in the ABS or HIPS process. It is further known that the dissolving time depends on the degree of branching in that linear polymers dissolve at a distinctly slower rate than branched polymers. The higher process viscosities and the longer dissolving time greatly reduce the economic viability of using linear polybutadienes.

It is yet further known that the branching is particularly important for the processibility of the polymer. Branched polymers used for ABS or HIPS improve the solution properties and reduce the dissolving time. The polymer molar mass and degree of branching determine the solution viscosity.

NdBR polymers and neodymium-catalysed polybutadienes are synonyms.

It is therefore desirable to provide a neodymium-catalysed polybutadiene which has the advantageous properties of linearity in respect of dynamic properties and also the advantageous properties of branching in respect of processibility.

Polybutadiene and polymer are used as synonyms.

The object is achieved by polybutadiene of the aforementioned kind, which has a linear polymeric main fraction and a long chain branched polymeric fraction, wherein the slope in the RGM relationship is >0.5 for the polymeric main fraction and <0.3 for the long chain branched polymeric fraction.

The fractions are eluted using asymmetric flow field flow fractionation (AF4).

The polybutadienes in question were preferably catalysed by neodymium-containing catalyst systems. Such systems are Ziegler-Natta catalysts based on neodymium compounds which are soluble in hydrocarbons.

The neodymium compounds used are particularly preferably neodymium carboxylates or neodymium alkoxides, more particularly neodymium neodecanoate, neodymium octanoate, neodymium naphthenate, neodymium 2,2-diethylhexanoate and/or neodymium 2,2-diethyl-heptanoate.

It was found that, surprisingly, the polybutadiene according to the invention has linearity and branching and accordingly combines the two properties.

In the past, size exclusion chromatography (SEC), coupled with light scattering or viscosity detection, was the only means available for characterizing the chain structure of polybutadiene as well as to determine its molecular weight distribution and parameters thereof. It has been determined that the NdBR according to the invention cannot be satisfactorily characterized using this method.

Asymmetric flow field flow fractionation (AF4) was therefore used because it is very useful as characterizing method. In AF4, separation takes place in an empty channel without stationary phase. Separation can accordingly be achieved almost free of shearing and interactions.

Structure-property relations make it possible to describe the correlation between molecular parameters and the properties of these polymers.

The RGM relation is a correlation between the radius of gyration (RMS) and the molar mass M of the macromolecule, and is evaluated in a log-log plot as the slope of the radius of gyration over the molar mass.

The radius of gyration (RMS) is determined by light scattering, where the irradiated light is scattered by the polymer coil. The angle dependence of the scattering signal is used to determine the hydrodynamic volume and/or the radius of gyration of the polymer.

In the case of linear polymers, the radius of gyration increases in proportion to the molar mass. As described inter alia in Journal of Applied Polymer Science, 54 (1994) 91-103, linear polymers have a slope of 0.5 to 0.6 in the RGM relation. For the same molar mass, the density in the polymer coil increases and the radius of gyration decreases with increasing branching in the polymer. The higher the degree of branching of the polymer, the lower the slope in the RGM relation. Branched polymers are described as having a slope of less than 0.5 in the RGM relation, and a slope of 0.33 and less indicates highly branched polymers of spherical geometry.

These parameters were determined using, in the course of the investigation, coupled systems consisting of a fractionating unit—asymmetric flow field flow fractionation—with multi-angled scattering photometers and concentration detectors.

Description of Analysis Via AF4:

Prior to analysis, the polymers were dissolved in HPLC-purity THF. The concentration is 3 mg/ml. In each case 1 mg/ml of BHT was added for stabilization. The dissolving time was 16 hours at room temperature, followed by 4 hours in an oven at 50° C. and a subsequent 48 hours at room temperature. Before and after the heat treatment, the polymer solution was agitated by slight shaking with the hand, otherwise no mechanical homogenization whatsoever took place. So as not to remove the high molecular weight particles of polymer, filtration was omitted. The AF4 channel was equipped with a regenerated cellulose membrane (cut-off mandate 10 kg/mol PS).

The molecular weights and concentrations were computed using a refractive index increment of 0.137 ml/mg for polybutadiene. All the measurements were made with the pump system of the AF4 2000 system from Postnova Analytics (Landsberg/Lech, Germany). The detector combination used is a MALLS detector from Dawn DSP, Wyatt Technology (Santa Barbara, USA) and an RI detector of the type PN 3140 from Postnova Analytics (Landsberg/Lech, Germany).

Figure 1:
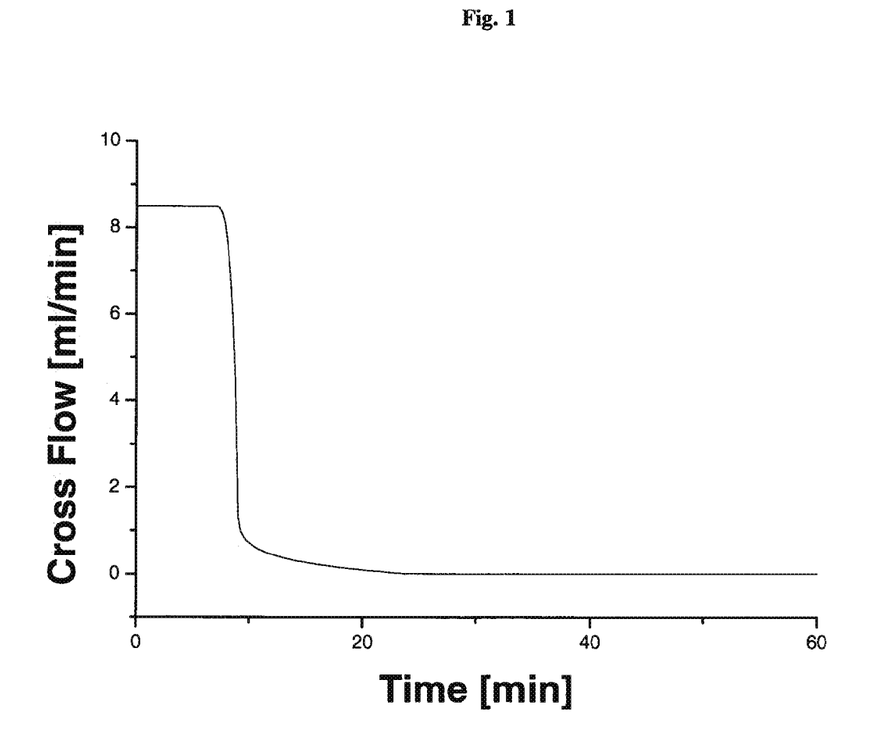

FIG. 1 shows a function of the cross flow gradient used in the AF4 analysis:

The injection volume in the AF4 analysis was 100 µl. Following the injection phase, the sample was conveyed into the channel at a flow rate of 0.2 ml/min so as to pre-empt any degradation of the molecules in the relatively highly concentrated solution. During this procedure, the cross flow remains constantly at its maximum value. A second flow, the so-called focus, is likewise active during the injection procedure. This flow ensures a constant flow of 0.5 ml/min through the detector, and makes it possible to fix the injected sample within a very narrow zone (reducing the later bands broadening). Following the injection phase of 4 minutes, the focus is exponentially reduced to 0 within 1 minute and the cross flow program follows.

It can be determined that the polymers according to the invention consist of two fractions, a linear main fraction, which has a slope >0.5 in the RGM relation, and a long chain branched polymeric fraction having a slope of <0.3 in the RGM relation.

The high degree of branching of the long chain branched polymeric fraction reduces the maximum radius of gyration of the dissolved polymers, and so the proportion of polymers which have a radius of gyration of above 100 nm is <15%, preferably <10% and more preferably <5%.

The width of the distribution of radii of gyration is very narrow, amounting to <45 nm, preferably <40 nm and more preferably <35 nm.

The width of the distribution of radii of gyration is determined from the differential plot. The maximum differential value of the distribution of radii is halved and the width of the distribution of radii of gyration is obtained as difference between the two radii values of the curve at these numerical values.

Preferably, the polybutadiene according to the invention has a long chain branched polymeric fraction comprising polymers >1 million g/mol.

Preferably, the linear polymeric main fraction is greater than the long chain branched polymeric fraction.

A process is provided for producing the polybutadiene according to the invention, the process comprising the steps of:

1. modified catalyst production with preforming using catalyst systems based on neodymium consisting of
    component A: an alkoxide, a phosphonate, phosphinate and/or phosphate, a carboxylate, a complexed compound of rare earth metals with diketones and/or an addition compound of the halides of the rare earth metals with an oxygen or nitrogen donor compound, preferably neodymium versatate,
    component B: a dialkylaluminium hydride, preferably diisobutylaluminium hydride (DIBAH),
    component C: a diene, preferably butadiene or isoprene, and
    component D: and at least one organometallic halide, preferably ethylaluminium sesquichloride (EASC),
    wherein initially, in a first step, the components A, B and C are mixed at a temperature of −20° C. to 80° C., preferably 0° C. to 40° C., for a period of 5 minutes to 10 hours, preferably 10 minutes to 2 hours, and then the mixture is cooled down to below −10° C., preferably to below −30° C., prior to addition of component D;
2. optionally preforming the modified catalyst system at a temperature of −30° C. to 80° C., preferably 5° C. to 50° C., for the duration of 10 minutes to 250 hours, preferably 20 minutes to 100 hours;
3. polymerizing the monomers at a temperature between −20 and 100° C.,
4. subsequently maintaining the polymerization solution at the end, viz, at a conversion of ≥85% by weight, preferably ≥90% by weight and more preferably ≥95% by weight, of butadiene at a temperature of ≥100° C., preferably 100° C. to 140° C. and more preferably 100° C. to 125° C. for 10 to 120 min, preferably for 15 to 60 min.

The process according to the present invention provides a neodymium-based catalyst system that has optimum activity and leads to the desired polymer mentioned above. It is an interplay of the quantity and action of the constituents of the catalyst that determines the final properties of the polymer and also the economics of the production process.

Component C is preferably the same monomer as used for producing high molecular weight neodymium-catalysed polybutadienes. The presence of the diene in the production of the catalyst is particularly important, since a stable catalyst complex can thereby be formed. Useful solvents include hexane, cyclohexane, toluene or a solvent mixture of the C6 fraction. Other solvents are similarly conceivable.

The solvent can be added in pure form or as solvent of the individual catalyst components. The amount of solvent depends on component A in that the concentration of component A to solvent is between 0.05 and 0.3 mol/L and preferably between 0.08 and 0.2 mol/L.

The molar ratio of component A to component B is in the range from 1:1 to 1:100, preferably in the range from 1:3 to 1:80 and more preferably in the range from 1:3 to 1:50. The molar ratio of component A to component C is in the range from 1:1 to 1:200, preferably in the range from 1:2 to 1:100 and more preferably in the range from 1:3 to 1:50. The molar ratio of component A to component D is in the range from 1:0.5 to 1:20, preferably in the range from 1:0.7 to 1:10 and more preferably in the range from 1:0.8 to 1:8.

The cooling temperature in step 1 of the modified catalyst production is preferably −10° C. or −20° C., preferably −30° C. and more preferably −60° C.

It is further possible to use an aluminium trialkyl, preferably tributylaluminium (TIBA), for the catalyst system production. The molar ratio of component A to aluminium trialkyl, preferably tributylaluminium (TIBA), is in the range from 1:0.4 to 1:15 and preferably in the range from 1:0.5 to 1:8.

After the catalyst system was preformed, if preforming is desired, the polymerization is carried out in organic solvents. These solvents have to be inert to the catalyst system used. Examples of suitable solvents are aromatic, aliphatic and cycloaliphatic hydrocarbons such as benzene, toluene, pentane, n-hexane, isohexane, heptane and cyclohexane.

The polymerisation can be carried out continuously as well as batchwise.

The polymerisation is carried out at a temperature between −20 and 100° C. In one typical embodiment, the catalyst consisting of the components A, B, C and D and optionally TIBA is added to a mixture of 100 parts by weight of solvent with 5 to 50 parts by weight and preferably 8 to 30 parts by weight of monomer.

The time maintained at the end of the polymerisation is herein also referred to as delay time.

The delay time at suitable temperature ensures the branching reaction in the case of polymers above 1 million g/mol.

The temperature at the end of the polymerisation, i.e. during the delay time, is preferably in the range from 100 to 140° C. and more preferably in the range from 100 to 120° C.

On completion of the delay time the catalyst is deactivated by addition of small amounts of water, carboxylic acids or alcohols for example.

Polymer solution and polymerisation solution are understood as synonyms.

Customary stabilisers can be added to the polymer solution in customary amounts prior to the work-up. Examples of stabilisers used are sterically hindered phenols or aromatic amines or phosphites such as 2,6-di-tert-butyl-4,5-methylphenol for example.

The polymers are isolated by evaporating the polymer solution, by precipitating with a nonsolvent such as methanol, ethanol, acetone for example or preferably by steam distillation of the solvent.

The stripping with steam is followed by water removal using suitable sieve or screw assemblies such as expeller/expander screws or moving bed dryers.

Drying takes place in a conventional manner, for example in a drying cabinet or in a screw dryer.

The polybutadienes according to the invention can further be used alone, cut with aromatic or aliphatic oils or admixed with other rubbers in the production of rubber mixtures and rubber vulcanisates as used for example in the tyre industry or in the manufacture of shoe soles or industrial rubber goods. Suitable additional rubbers for producing rubber vulcanisates include not only natural rubber but also synthetic rubbers. Preferred synthetic rubbers are described for example in W. Hofmann, Kautschuktechnologie, Gentner Verlag, Stuttgart 1980 and I. Franta, Elastomers and Rubber Compounding Materials, Elsevier, Amsterdam 1989. They include inter alia BR—conventional polybutadiene
ABR—butadiene/C1-C4-alkyl acrylate copolymers
CR—polychloroprene
IR—polyisoprene
SBR—styrene/butadiene copolymers having styrene contents of 1% to 60% and preferably of 20% to 50% by weight
IIR—isobutylene-isoprene copolymers
NBR—butadiene-acrylonitrile copolymers having acrylonitrile contents of 5% to 60% and preferably of 10% to 40% by weight
HNBR—partially hydrogenated or fully hydrogenated NBR rubber
EPDM—ethylene-propylene-diene copolymers and mixtures of these rubbers. Materials of interest for the production of motor vehicle tyres with the aid of surface-modified fillers are in particular natural rubber, emulsion SBR and also solution SBR rubbers with a glass transition temperature above −50° C., which may optionally be modified with silyl ethers or other functional groups, as described in EP-A-0 447 066, polybutadiene rubber of high 1,4-cis content (>90%), produced using catalysts based on Ni, Co, Ti or Nd, and also polybutadiene rubber having a vinyl content of 0 to 75%, and also mixtures thereof.

The invention further provides the rubber mixtures containing the polybutadiene according to the invention, which generally contain from 5 to 300 parts by weight of an active or inert filler, e.g.

colloidal silicas, produced for example via precipitation from solutions of silicates, or flame hydrolysis of silicon halides with specific surface areas in the range from 5 to 1000 and preferably in the range from 20 to 400 m$^2$/g (BET surface area) and with primary particle sizes in the range from 10 to 400 nm. The silicas may optionally also be present as mixed oxides with other metal oxides, such as oxides of Al, of Mg, of Ca, of Ba, of Zn, of Zr or of Ti, synthetic silicates, such as aluminium silicate, alkaline earth metal silicate such as magnesium silicate or calcium silicate, with BET surface areas of 20 to 400 m$^2$/g and primary particle diameters of 10 to 400 nm, natural silicates, such as kaolin and other naturally occurring silica, glass fibres and glass-fibre products (mats, strands) or glass microbeads, metal oxides, such as zinc oxide, calcium oxide, magnesium oxide, aluminium oxide, metal carbonates, such as magnesium carbonate, calcium carbonate, zinc carbonate, metal hydroxides, e.g. aluminium hydroxide, magnesium hydroxide, metal salts, e.g. the zinc or magnesium salts of [alpha], [beta]-unsaturated fatty acids, e.g. acrylic or methacrylic acid, with 3 to 8 carbon atoms, such as zinc acrylate, zinc diacrylate, zinc methacrylate, zinc dimethacrylate and mixtures thereof;

carbon blacks. The carbon blacks to be used herein are produced by the lamp-black, furnace-black or gas-black process, and have BET surface areas of 20 to 200 m$^2$/g, e.g. SAF, ISAF, HAF, FEF or GPF carbon blacks.

rubber gels, particularly those based on polybutadiene, butadiene-styrene copolymers, butadiene-acrylonitrile copolymers and polychloroprene.

Zinc diacrylates, colloidal silicas and carbon blacks are particularly preferred.

The fillers mentioned can be used alone or mixed. In one particularly preferred embodiment, the rubber mixtures contain a mixture of light-coloured fillers, such as colloidal silicas, and carbon blacks in a mixing ratio in the range from 0.05 to 20 and preferably from 0.1 to 10 for the light-coloured fillets to the blacks.

The fillers are preferably added as solid materials or as a slurry in water or a solvent to the solution of the polybutadiene(s) according to the invention. The rubber solution can be produced in advance, but it is preferable to use the as-polymerized solution directly. Subsequently, the solvent is removed thermally or preferably with the aid of steam. The conditions for this stripping process are easily determined in preliminary experimentation.

It is further preferable for the fillers to be added to the solid polybutadiene according to the invention or to a mixture of rubbers and be incorporated in a known manner using a kneader for example.

The rubber mixtures according to the invention further contain crosslinkers, if desired. Sulphur or peroxides can be used as crosslinkers, in which case sulphur is particularly preferred. The rubber mixtures according to the invention may contain further rubber auxiliary products, such as reaction accelerators, antioxidants, heat stabilizers, light stabilizers, antiozonants, processing aids, plasticizers, tackifiers, blowing agents, dyes, pigments, waxes, extenders, organic acids, retarders, metal oxides and also activators such as triethanolamine, polyethylene glycol, hexanetriol, etc, which are known in the rubber industry.

In the preferred rubber mixtures with high-activity precipitated silicas, the use of additional filler-activators is particularly advantageous. Preferred filler-activators are sulphur-containing silyl ethers, more particularly bis(trialkoxysilylalkyl) polysulphides as described in DE-A-2.141.159 and DE-A-2.255.577, oligomeric and/or polymeric sulphur-containing silyl ethers of DE-A-4.435.311 and EP-A-0 670 347, mercaptoalkyltrialkoxysilanes, more particularly mercaptopropyltriethoxysilane and thiocyanatoalkyl silyl ethers as described in DE-A-195 44 469 for example.

The rubber auxiliaries are used in customary amounts, which depend on the intended use among other considerations. Customary amounts range for example from 0.1% to 50% by weight, based on rubber.

The further admixing of the rubbers with the other mentioned rubber auxiliary products, crosslinkers and accelerators can be carried out in a conventional manner using suitable mixing assemblies, such as rolls, internal mixers and mixing extruders.

Compounding and vulcanisation are more particularly described for example in Encyclopedia of Polymer Science and Engineering, Vol. 4, pages 66 ff (compounding) and Vol. 17, pages 666 ff (vulcanisation).

The rubber mixtures according to the invention can be vulcanized at customary temperatures of 100 to 200° C. and preferably 130 to 180° C. (optionally under pressure 10 to 200 bar).

The rubber mixtures according to the invention are very useful in the manufacture of moulded articles of any kind.

Nonlimiting examples of these moulded articles are O-rings, profiles, gaskets, membranes, tyres, tyre treads, damping elements and hoses.

Particular preference is given to various structural tyre components and tyre treads.

The rubber mixtures according to the invention are further useful for impact modification of thermoplastics, more particularly for polystyrene and styrene-acrylonitrile copolymers.

To produce impact-modified moulding compositions, such as HIPS or ABS, the polymer (synonym for polybutadiene) according to the invention is preferably first dissolved in the presence of vinylaromatic monomers, more particularly in the presence of styrene, alpha-methylstyrene, alpha-methylstyrene dimer, p-methylstyrene, divinylbenzene and/or other ring-substituted alkylstyrenes, preferably having 2 to 6 carbon atoms in the alkyl radial. This provides a vinylaromatic polymer solution.

Subsequently, a moulding composition is produced by free-radical polymerisation of the vinylaromatic polymer solution or in the presence of ethylenically unsaturated nitrile monomer and optionally by addition of further vinylaromatic monomers and optionally in the presence of solvents in continuous, semi-continuous or batch operation of the vinylaromatic polymer solution according to known processes of bulk, solution or suspension polymerisation.

Acrylic monomers or maleic acid derivatives can be used preferably at up to 30% by weight and more preferably at up to 20% by weight of total monomers.

When the free-radical polymerisation is carried out in solvents, useful solvents include aromatic hydrocarbons such as toluene, ethylbenzene, xylenes and ketones such as acetone, methyl ethyl ketone, methyl propyl ketones, methyl butyl ketones and also mixtures thereof. Preference is given to ethylbenzene, methyl ethyl ketone and acetone and also to mixtures thereof.

The polymerisation is advantageously started by means of free-radical initiators, but it can also be carried out thermally; the molecular weight of the polymer formed can be adjusted by means of molecular weight regulators.

Suitable initiators for the free-radical polymerisation are graft-active peroxides which decompose into free radicals.

The molecular weights can be set using customary molecular weight regulators such as mercaptans, olefins, e.g. tert-dodecyl mercaptan, n-dodecyl mercaptan, cyclohexene, terpinolene, alpha-methylstyrene dimer.

The process can be carried out batchwise, semi-continuously and continuously.

The moulding compositions according to the invention can be thermoplastically processed by extrusion, injection moulding, calendering, blow moulding, pressing and sintering to form moulded parts.

The use of the rubber mixtures is particularly suitable for golf balls, more particularly golf ball cores.

The invention will now be more particularly described with reference to examples.

EXAMPLES

Example 1

Catalyst Production and Preforming

A dry, argon-inertized Schlenk vessel was charged with 7.5 mL (42 mmol) of diisobutylaluminium hydride, 1.2 mL (12 mmol) of isoprene and also 11.3 mL (3 mmol) of a 0.265 molar solution of neodymium versatate in hexane. This was followed by 90 min of stirring at 50° C. This was followed by cooling down to 5° C. and the addition of 8 mL (2 mmol) of a 0.25 molar solution of ethylaluminium sesquichloride in hexane. The preformed catalyst solution was left to stand overnight at room temperature and was then used for the polymerisation.

slope of the radius of gyration over the molar mass. For this, the natural logarithm of the molar mass and of the radius of gyration RMS was computed. The slope of the RGM relation over a specific molar mass range is given by the quotient of the difference of the natural logarithms of RMS at the limits of the range under consideration, divided by the difference of the natural logarithms of the molar mass at the limits of the range under consideration.

Table 1 shows the numerical values determined:

TABLE 1

|  | molar mass | ln molar mass | RMS | ln RMS | RGM relation slope (Quotient of ln RMS difference by ln molar mass difference) | |
|---|---|---|---|---|---|---|
| linear polymeric main fraction | 250,000 | 12.43 | 33.6 | 3.51 | | |
|  | 1,000,000 | 13.82 | 69.4 | 4.24 | | |
| difference |  | 1.39 |  | 0.73 | 0.52 | RGM slope #1 |
| long chain branched polymeric fraction | 1,000,000 | 13.82 | 69.4 | 4.24 | | |
|  | 10,000,000 | 16.12 | 109.8 | 4.70 | | |
| difference |  | 2.30 |  | 0.46 | 0.20 | RGM slope #2 |

Polymerisation:

A dry, argon-inertized 1.9 L glass autoclave was charged with 580 g of hexane (dried over molecular sieve), 1.68 mL of the preformed catalyst solution described above and 120 g of butadiene. This was followed by heating to 65° C. and 90 min of polymerisation under stirring. A sample was taken to measure conversion. Butadiene conversion after the polymerisation was 95%.

To reach the delay time, the polymer solution was wall heated to 105° C. for 60 min.

Then, 586 g of the viscous solution were drained off, and 2 mL of methanol and also 0.6 g of bis[3-t-butyl-2-hydroxy-5-methylphenyl]methane were incorporated under stirring. Thereafter, the polymer was vacuum dried at 70° C. Weight of product after drying: 99.3 g Mooney viscosity (ML 1+4 at 100° C.): 43 MU; ML-Relax 30 sec: 5.4% solution viscosity (5.43% in toluene, at room temperature): 183 mPas ratio of solution viscosity to Mooney (LV/ML): 4.3

RGM Relation and Radius of Gyration (RMS):

To determine the RGM relation, the polybutadiene according to the invention was eluted and analysed using AF4. For sample preparation and analysis mandates reference is made here to pages 3 to 5 of the description.

First, a radius of gyration (RMS) is determined for the polybutadiene according to the invention. Reference is made here to pages 3, 4 and 5 of the description.

Figure 2:
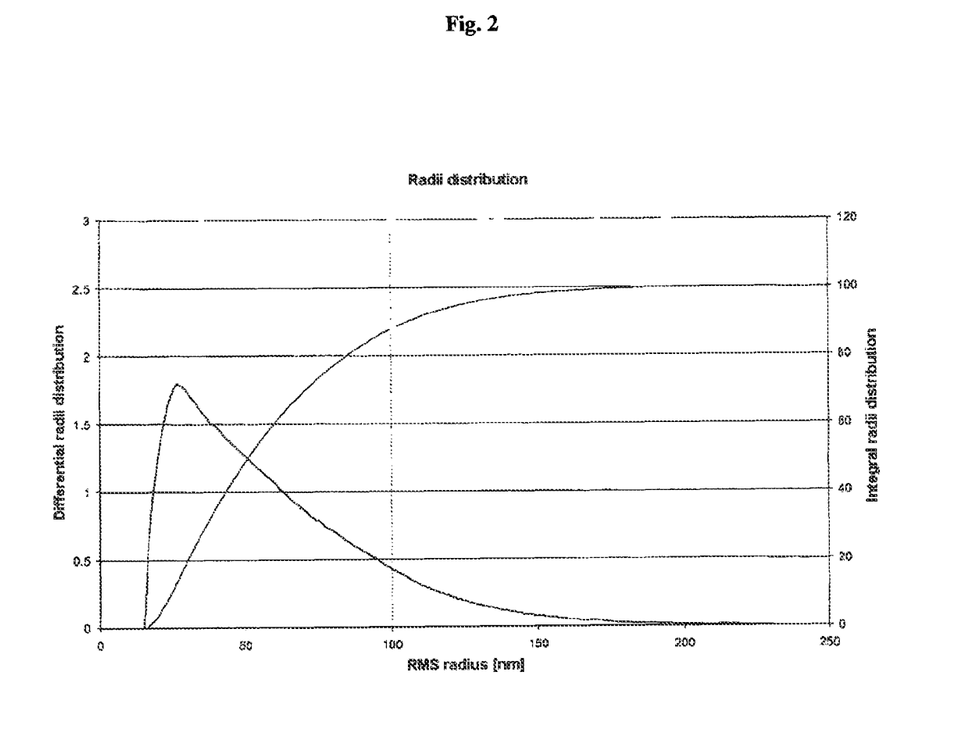

FIG. 2 shows the radii distribution of the polybutadiene according to the invention, plotted as a differential radii distribution (solid line) and as an integral radii distribution (broken line). The integral radii fraction having a radius of gyration of above 100 nm is 1.4%. The full width at half maximum of the radii distribution is 29.0 nm.

To compute the slope of the RGM relation, the statistical mean was formed from 5 numbers in each case, the numbers used being the two closest measurements below and above the stated molar mass and the molar mass itself.

Figure 3:
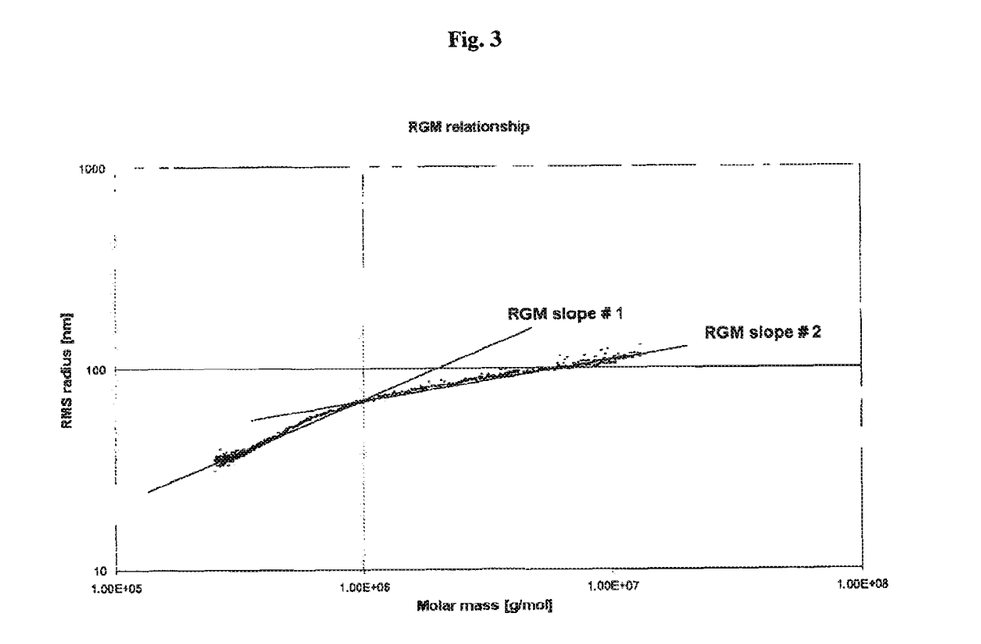

The radius of gyration is typically abbreviated RMS. The slope of the RGM relation is computed in a log-log plot as the FIG. 3 shows a graphic representation of the RGM relation for the polybutadiene according to the invention. A smaller slope from 1 million g/mol molar mass is clearly apparent. This means that the polybutadiene according to the invention has a linear structure below 1 million g/mol molar mass, while the molar mass thereabove has long chain branching.

Comparative Example

Polymerisation without Catalyst Preforming and without Delay Time

A dry, argon-inertized 1.9 L glass autoclave was charged with 8500 g of hexane (dried over molecular sieve), 23.0 mL of an 18.45% solution of diisobutylaluminium hydride in hexane, 2.75 mL of a 40% solution of neodymium versatate in hexane, 5.1 mL of a 10% solution of ethylaluminium sesquichloride in hexane and 1300 g of butadiene. This was followed by heating to 73° C. and 90 min of polymerisation under stirring. Then, 1012 g of the viscous solution were drained off, and 2 mL of methanol and also 2.5 g of bis[3-t-butyl-2-hydroxy-5-methylphenyl]methane were incorporated under stirring. Thereafter, the polymer was vacuum dried at 70° C. Weight of product after drying: 129.5 g Mooney viscosity (ML 1+4 at 100° C.): 43 MU; ML-Relax 30 sec: 6.2% solution viscosity (5.43% in toluene, at room temperature): 663 mPas ratio of solution viscosity to Mooney (LV/ML): 15.4

RGM Ration and Radii Distribution:

Example 1 was repeated to determine the RGM relation and the radius of gyration of the polybutadiene for the comparative example.

Figure 4:
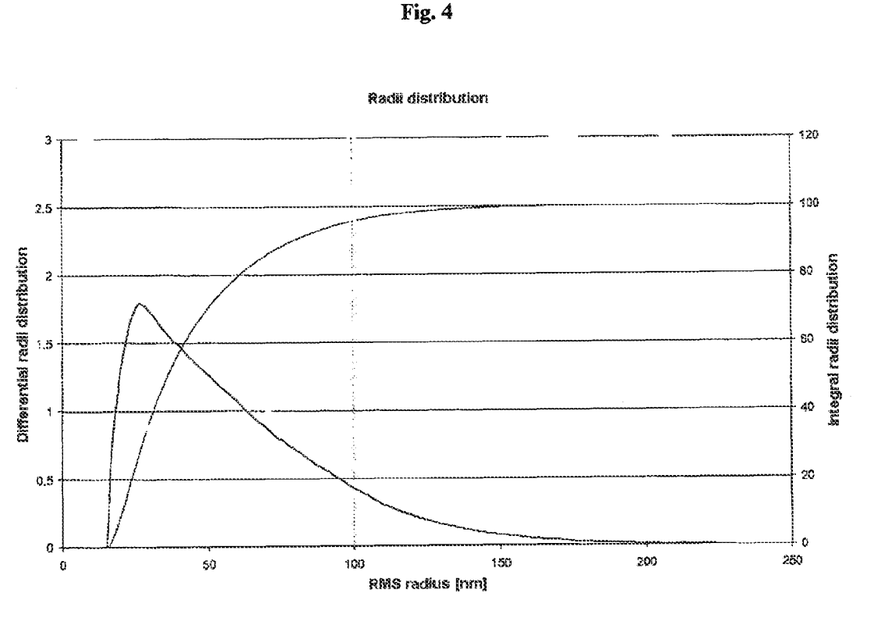

FIG. 4 shows the radii distribution of the comparative example, plotted as a differential radii distribution (solid line) and as an integral radii distribution (broken line). The integral radii fraction having a radius of gyration of above 100 nm is 12.2%. The full width at half maximum of the radii distribution is 50.7 nm.

To compute the slope of the RGM relation, the statistical mean was formed from 5 numbers in each case, the numbers used being the two closest measurements below and above the stated molar mass and the molar mass itself.

The radius of gyration is typically abbreviated RMS. The slope of the RGM relation is computed in a log-log plot as the slope of the radius of gyration over the molar mass. For this, the natural logarithm of the molar mass and of the radius of gyration RMS was computed. The slope of the RGM relation over a specific molar mass range is given by the quotient of the difference of the natural logarithms of RMS at the limits of the range under consideration, divided by the difference of the natural logarithms of the molar mass at the limits of the range under consideration.

Table 2 shows the numerical values determined:

TABLE 2

| | molar mass | ln molar mass | RMS | ln RMS | RGM relation slope (Quotient of ln RMS difference by ln molar mass difference) | |
|---|---|---|---|---|---|---|
| linear polymeric main fraction | 250,000 | 12.43 | 34.2 | 3.53 | | |
| | 1,000,000 | 13.82 | 68.9 | 4.23 | | |
| difference | | 1.39 | | 0.70 | 0.51 | RGM slope #1 |
| long chain branched polymeric fraction | 1,000,000 | 13.82 | 68.9 | 4.23 | | |
| | 10,000,000 | 16.12 | 193.5 | 5.27 | | |
| difference | | 2.30 | | 1.03 | 0.45 | RGM slope #2 |

Figure 5:
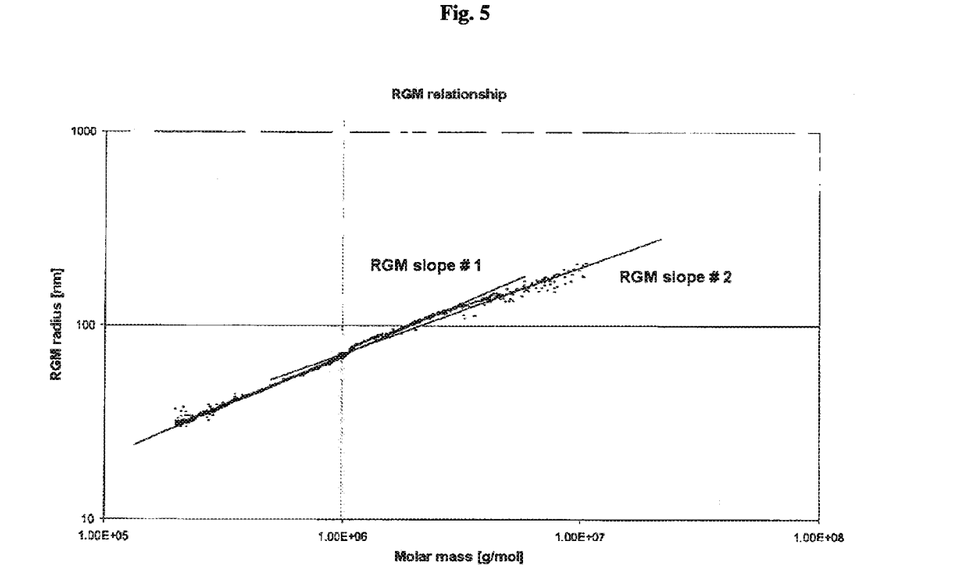

FIG. 5 shows a graphical depiction of the RGM relation for the comparative polybutadiene. It is clearly apparent that a slope starting at 1 million g/mol molar mass is approximately identical to the slope up to 1 million g/mol molar mass. This means that the comparative polybutadiene has an entirely linear structure.

What is claimed is:

1. Bimodal neodymium-catalysed polybutadiene having greater than 95%, of cis-1,4 units and less than 1%, of 1,2-vinyl content, wherein the bimodal neodymium-catalysed polybutadiene has a linear polymeric main fraction and a long chain branched polymeric fraction, wherein the slope in the RGM relationship is greater than 0.5 for the polymeric main fraction and less than 0.3 for the long chain branched polymeric fraction.

2. The polybutadiene according to claim 1, wherein the proportion thereof which has a radius of gyration of above 100 nm is less than 15%.

3. The polybutadiene according to claim 2, wherein the width of the polybutadiene's distribution of radii of gyration is less than 45 nm.

4. The polybutadiene according to claim 2, wherein the width of the polybutadiene's distribution of radii of gyration is <35 nm.

5. The polybutadiene according to claim 1, wherein the proportion thereof which has a radius of gyration of above 100 nm is <5%.

6. A process for producing bimodal neodymium-catalysed polybutadiene having greater than 95% of cis-1,4 units and less than 1% of 1,2-vinyl content, wherein the bimodal neodymium-catalysed polybutadiene has a linear polymeric main fraction and a long chain branched polymeric fraction, wherein the slope in the RGM relationship is greater than 0.5 for the polymeric main fraction and less than 0.3 for the long chain branched polymeric fraction, comprising the steps of:

a) performing a modified catalyst system comprising:
component A: an alkoxide, a phosphonate, phosphinate and/or phosphate, a carboxylate, a complexed compound of rare earth metals with diketones and/or an addition compound of the halides of the rare earth metals with an oxygen or nitrogen donor compound,
component B: a dialkylaluminium hydride,
component C: a diene, and
component D: at least one organometallic halide,
by mixing the components A, B and C are at a temperature of −20° C. to 80° C., for a period of 5 minutes to 10 hours to produce a mixture, cooling the mixture to a temperature below −10° C. to produce a cooled mixture, and adding component D to the cooled mixture to produce the modified catalyst system;

b) optionally performing the modified catalyst system at a temperature of −30° C. to 80° C., for a period of 10 minutes to 250 hours;

c) polymerizing butadiene monomers in the presence of the modified catalyst system at a temperature between −20 and 100° C. to produce a polymerization solution, and d) after obtaining a conversion of butadiene of greater than or equal to 85% by weight in the step c, maintaining the polymerization solution at a temperature of greater than or equal to 100° C. for a delay time of 10 to 120 min.

7. Process according to claim 6, wherein the polymerizing further comprises polymerizing the butadiene monomers in the presence of an aluminium trialkyl,.

8. Process according to claim 6, wherein at the end of the polymerization the temperature during the delay time is maintained from 90° C. to 110° C.

9. The process according to claim 6, wherein component A is neodymium versatate.

10. The process according to claim 6, wherein component B is diisobutylaluminium hydride (DIBAH).

11. The process according to claim 6, wherein component C is butadiene or isoprene.

12. The process according to claim 6, wherein component D is ethylaluminium sesquichloride (EASC).

13. The process according to claim 6, wherein components A, B and C are mixed at a temperature of 0° C. to 40° C.

14. The process according to claim 6, wherein components A, B and C are mixed for a period of 10 minutes to 2 hours.

15. The process according to claim 6, wherein the mixture is cooled down to below −30° C., prior to addition of component D.

16. The process according to claim 6, wherein the preforming the modified catalyst system is at a temperature of 5° C. to 50° C.

17. The process according to claim 6, wherein the preforming the modified catalyst system is for the duration of 20 minutes to 100 hours.

18. The process according to claim 6, wherein the conversion of butadiene is greater than or equal to 95% by weight of butadiene.

19. The process according to claim 6, wherein the maintaining the polymerization solution is at 100° C. to 125° C.

20. The process according to claim 6, further comprising after the delay time, stabilizing the polymerization solution to produce a stabilized polymer solution, followed by isolating polymers from the stabilized polymer solution.

* * * * *